United States Patent
Colar et al.

(10) Patent No.: US 9,275,217 B2
(45) Date of Patent: Mar. 1, 2016

(54) ID USAGE TRACKER

(71) Applicant: International Business Machines Corporation, Armonk, NY (US)

(72) Inventors: Gerald Colar, Mableton, GA (US); Melanie Diggs, Mableton, GA (US); Terrence White, Cottage Grove, MN (US); Charles Young, Powder Springs, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/740,458

(22) Filed: Jan. 14, 2013

(65) Prior Publication Data

US 2014/0201825 A1     Jul. 17, 2014

(51) Int. Cl.
| | |
|---|---|
| G06F 21/00 | (2013.01) |
| G06F 21/40 | (2013.01) |
| H04L 29/06 | (2006.01) |
| H04L 9/32 | (2006.01) |

(52) U.S. Cl.
CPC ...... *G06F 21/40* (2013.01); *H04L 9/32* (2013.01); *H04L 63/08* (2013.01); *H04L 63/083* (2013.01); *H04L 63/0861* (2013.01)

(58) Field of Classification Search
CPC ..... G06F 21/31; H04L 63/08; H04L 63/0861; H04L 63/083; H04L 9/32; H04L 63/0281; H04L 63/104
USPC .......................................................... 726/7
See application file for complete search history.

(56) References Cited

U.S. PATENT DOCUMENTS

| | | | |
|---|---|---|---|
| 7,188,181 B1 | 3/2007 | Squier et al. | |
| 8,572,709 B2 * | 10/2013 | Hockings et al. | 726/8 |
| 2005/0114333 A1 | 5/2005 | Nagano et al. | |
| 2010/0175113 A1 | 7/2010 | Borghetti et al. | |
| 2010/0268778 A1 | 10/2010 | Kim et al. | |
| 2011/0023107 A1 * | 1/2011 | Chen et al. | 726/12 |
| 2011/0277016 A1 * | 11/2011 | Hockings et al. | 726/4 |
| 2011/0313847 A1 | 12/2011 | Cao et al. | |
| 2012/0180112 A1 | 7/2012 | Chen et al. | |
| 2013/0086630 A1 * | 4/2013 | Kavantzas et al. | 726/1 |

* cited by examiner

*Primary Examiner* — Ali Abyaneh
*Assistant Examiner* — Narciso Victoria
(74) *Attorney, Agent, or Firm* — Scully, Scott, Murphy & Presser, P.C.; Jeff Tang, Esq.

(57) ABSTRACT

There is provided a method for using a multi-user operating system. A user attempts to access the multi-user operating system. The user is prompted to enter a shared credential associated with the multi-user operating system and an individual credential of the user. The entered shared credential and the entered individual credential are verified. Access is granted to the user if both the entered shared credential and the entered individual credential are verified. Commands entered by the user granted the access are tracked via the entered shared credential while the user is using the multi-user operating system. The tracked commands indicate the entered individual credential.

10 Claims, 6 Drawing Sheets

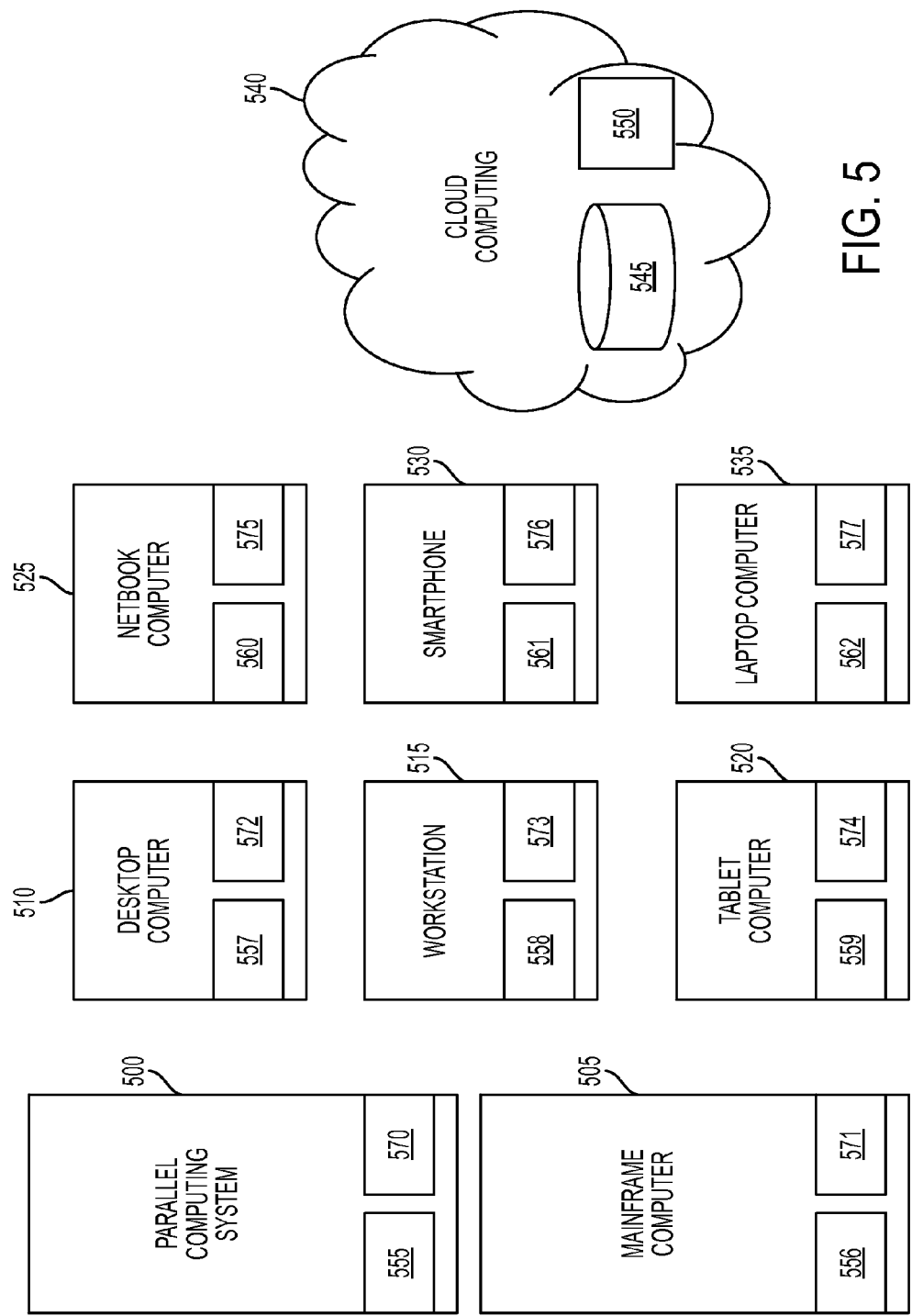

ID USAGE TRACKER

BACKGROUND

This disclosure relates generally to sharing of user privileges or credentials, and particularly to tracking of commands and users who entered those commands in a multi-user operating system in which those users share a credential to access that multi-user operating system.

BACKGROUND OF THE INVENTION

Currently there is no way to automatically track individuals that use a shared credential (e.g., "root" ID) on a multi-user operating system. A multi-user operating system includes, but is not limited to: UNIX®, Solaris®, AIX®, Linux®, Windows®, etc. operating system programs running on a computing device such as a server. Currently, once a server administrator logs in using the "root" ID in the multi-user operating system, the user is allowed to perform almost every tasks with this "root" ID with no centralized auditing capability to track commands entered by this user. A "root" ID refers to a credential given to a set of users who have all the rights and permissions to all the files and applications in the multi-user operating system.

The tracking of commands entered using the "root" ID can be a critical requirement on server administration teams where multiple administrators work in different time zones to support a single set of hardware servers 24 hours per day and 7 days a week. Many server administration teams have developed manual auditing processes to track commands entered by the "root" ID. These manual auditing processes rely on server administrators to be disciplined and meticulous while documenting their use of the "root" ID across multiple hardware servers. Furthermore, these manual auditing processes appear to be error-prone and inefficient.

SUMMARY

There is provided a method of sharing user credentials on a multi-user computing system. A user attempts to access the multi-user operating system. The user is prompted to enter a shared credential associated with the multi-user operating system and an individual credential of the user. The entered shared credential and the entered individual credential are verified. Access is granted to the user if both the entered shared credential and the entered individual credential are verified. Commands entered by the user granted the access are tracked via the entered shared credential while the user is using the multi-user operating system. The tracked commands indicate the entered individual credential.

In order to verify the entered shared credential, there is provided a control file that maps at least one shared credential to individual credentials of users who can use the shared credential. It is determines whether the entered shared credential is listed in the provided control file. In response to determining that the entered shared credential is listed in the control file, a further determination of whether the entered individual credential is listed under the entered shared credential is made.

The tracked commands are stored, in a file, along with the entered individual credential.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 5 illustrates exemplary computing nodes that can be used to implement the method steps shown in FIGS. 2 and 4.

DETAILED DESCRIPTION

Figure 1:
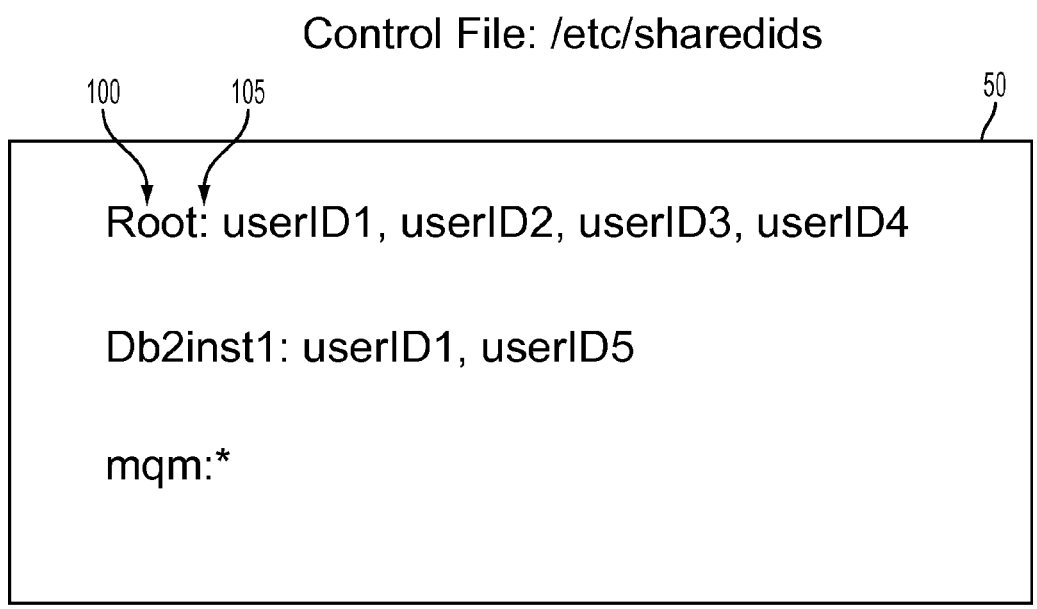
FIG. 1 illustrates an exemplary control file that lists shared credentials and their corresponding individual credentials which represent users who can use the shared credentials.

This disclosure describes a new method that tracks commands along with users who entered those commands in a multi-user operating system, e.g., by enforcing a user to enter a shared credential as well as an individual credential of that user when that user attempts to login to the multi-user operating system. Upon providing a valid shared credential and a valid individual credential, the user can access and use the multi-user operating system as if the user logged in to the multi-user operating system as the shared credential, e.g., "root" ID.

By tracking the commands along with individual credentials which represent users who entered those commands, a manual auditing process of a shared credential may no longer be needed. When a user uses a multi-user operating system by using a shared credential, that multi-user operating system tracks commands entered by that user by pairing that shared credential with an individual credential of that user.

There is provided a control file that maps at least one shared credentials to at least one individual credential that represents at least one user who can share the shared credential. While logging in to the multi-user operating system, each user is prompted to enter a shared credential and a corresponding password that the user wants to use, along with an individual credential of that user and a password corresponding to that individual credential. The multi-user operating system records individual credentials which represent users who are allowed to share the shared credential(s) in the control file in a specific directory of the multi-user operating system, e.g.,/etc/ directory of UNIX®. /etc/directory is known for storing configuration files for software applications that run on the multi-user operating system. The control file may be named as a "shared.ids" file in order to indicate that the control file stores at least one shared credential.

After a user's logging into a multi-user operating system completes, that multi-user operating system would behave in a standard fashion and allow that user to use the multi-user operating system under an identity of a shared credential that the user used to log into the multi-user operating system. The multi-user operating system records, in a file, e.g., a history file in UNIX® system, any commands entered by the user who uses the shared credential. In one embodiment, this file further records the individual credential of that user who uses the shared credential. A traditional history file in UNIX® system lists commands entered by one or more users using a credential. Note that a traditional history file retrieved by "history" command in UNIX® system does not indicate individual credential(s) corresponding to the entered commands. "History" command in UNIX® system allows a user to view commands entered by that user after that user logs into that UNIX® system. Based on the traditional history file, a user using a shared credential could not identify who entered which command by using that shared credential.

The use of the shared credential with the individual credential can present an alternative to using sudo or su privilege that allows, in a UNIX® system, a user to run the multi-user operating system with a privilege of another user. Whether a user logs into the multi-user operating system using the shared credential via a standard login process or via "sudo su" or "su," any user who shares the shared credential can automatically track the commands entered by other users who also use the shared credential via other individual credentials, e.g., by typing a command that retrieves the recorded file. An example of that command includes, but is not limited to: "history" command in UNIX® system. A user can define a shared credential on the multi-user operating system, e.g., by creating the control file and storing the control file in a specific directory of the multi-user operating system, e.g., /etc/ directory in UNIX® system. The multi-user operating system may read the control file if a user wants to access the multi-user operating system using a shared credential. A user can further define an access to a shared credential on the multi-user operating system. In other words, that user prepares the control file that maps that shared credential to individual credential(s) whose users can share the shared credential. The user can control other users who can log into the multi-user operating system using a shared credential, e.g., by creating the control file and storing the control file in a specific directory of the multi-user operating system. The multi-user operating system may read the control file if a user wants to access the multi-user operating system by using a shared credential.

By recording, e.g., in the control file, individual credentials whose users can use a shared credential to log into a multi-user operating system, the multi-user operating system can track usages of the shared credential. In one embodiment, in order to track usages of the shared credential, the multi-user operating system stores, e.g., in a history file in UNIX® system, commands entered using the shared credentials along with individual credentials which represent users who entered those commands. Furthermore, the multi-user operating system tracks users who use the shared credential, e.g., by creating this history file that records all commands and corresponding individual credentials whose users entered those commands using the shared credential. By enforcing a user to enter a shared credential and an individual credential to access the multi-user operating system, the multi-user operating system enables a "reverse sudo" effect, which makes a user to disclose his individual identity when he runs an application using the shared credential. The multi-user operating system can also track all the users who have run "sudo" command in order to use a particular privilege (e.g., "root" ID, etc.) of a particular user (e.g., a sever administrator in UNIX® system). For example, that particular user may create the control file that maps that particular privilege to individual credentials whose users can share that particular credential.

In one embodiment, a multi-user operating system, for example, UNIX® system, creates a file in a specific directory, e.g., /etc/directory in UNIX®, which specifies encrypted passwords corresponding to shared credentials. An example of this file includes, but is not limited to: /etc/passwd file in UNIX® system which stores user information, for example, (individual and shared) credentials and their corresponding passwords. Once a user wants to access using a shared credential, the multi-user operating system prompts the user to enter a password corresponding to the shared credential, e.g., via a graphical user interface (not shown). Once the user enters a password, the multi-user operating system compares the entered password against the password, specified in the file, corresponding to the shared credential in order to determine whether the user is a valid user entitled to use the shared credential.

FIG. 1 illustrates an exemplary control file 50. For purposes of description, the stored location of a control file 50 is assumed known to a multi-user operating system such as a UNIX® system. In order to configure a shared credential to be shared among a plurality of users, an administrator of the multi-user operating system creates the control file to map at least one shared credential to individual credentials of users who can share the shared credential. In one embodiment, the administrator may store the created control file in a specific directory, e.g., /etc/directory, of the multi-user operating system.

In FIG. 1, the example control 50 shows three exemplary shared credentials: "Root" ID, "Db2inst1" ID, and "mqm" ID. However, a control file can include a plurality of shared credentials. In FIG. 1, user ID1, user ID2, user ID3, and user ID4 are the only users that can log into the multi-user operating system using "Root" ID. user ID1, user ID2, user ID3, and user ID4 refer to individual credentials to which the shared credential "Root" ID 100 is mapped. Similarly, user ID1 and user ID5 are the only users that can log into the multi-user operating system using "Db2inst1" ID. user ID1 and user ID5 refer to individual credentials to which the shared credential "Db2inst1" ID is mapped. All users are able to share the shared credential "mqm" ID as long as they have a valid password corresponding to this shared credential "mqm" ID.

Figure 4:
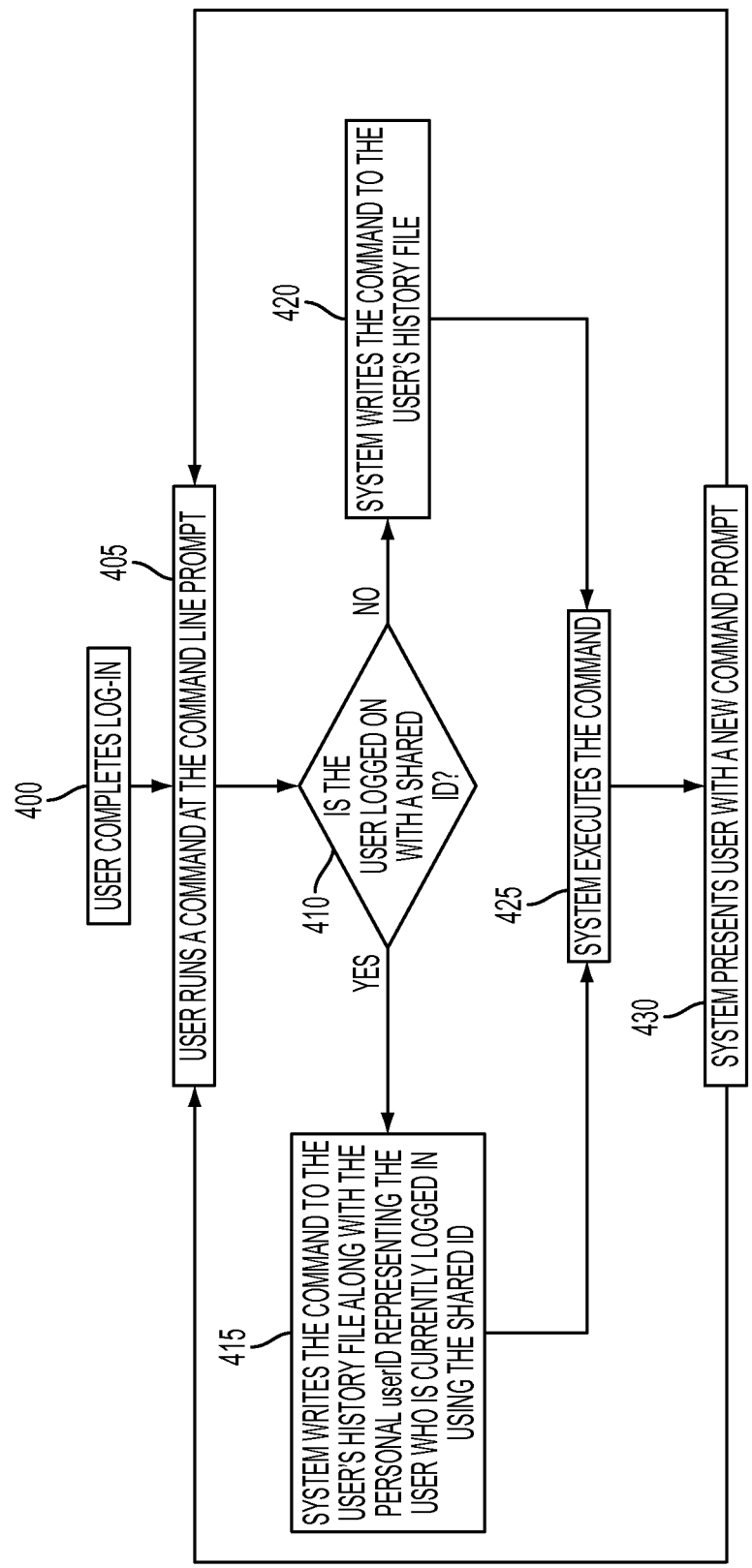
FIG. 4 illustrates a flow chart that describes method steps for indicating individual credentials and tracking their corresponding commands in a history file.

In the control file, a first user ID listed on each row is a shared credential, e.g., "Root" ID 100. A colon 105 serves as a delimiter to separate a shared credential from individual credentials which represent users who are allowed to use that shared credential. Based on the control file, the multi-user operating system prevents a user whose individual credential is not listed under a corresponding shared credential from accessing the multi-user operating system using the corresponding shared credential. The multi-user operating system prompts each user to enter his or her individual credential and a corresponding password when that user wants to access the multi-user operating system using a shared credential. By enforcing each user to enter an individual credential as well as a shared credential, the multi-user operating system tracks commands entered by that user using that shared credential, e.g., by running method steps shown in FIG. 4. FIG. 4 is described in detail below.

Figure 2A:
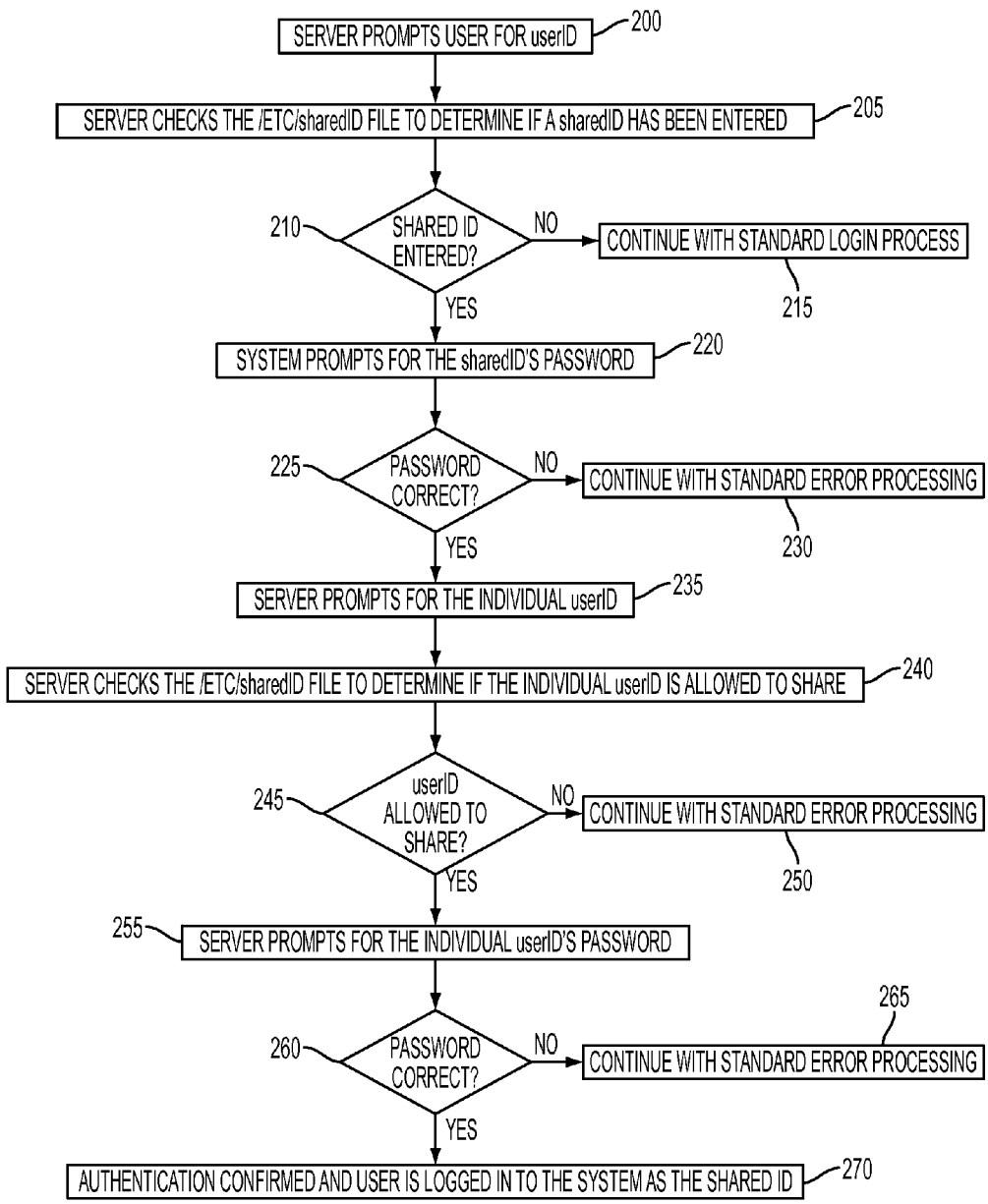
FIG. 2A illustrates a flow charts that describes method steps of a login process to a multi-user operating system.

FIG. 2A illustrates a flow chart that describes method steps for logging into the multi-user operating system in one embodiment. At step 200, a user attempts to access the multi-user operating system. The multi-user operating system prompts the user to enter a credential to access the multi-user operating system. At step 205-210, when the user enters a credential, the multi-user operating system reads the control file from the specific directory in which the control file is stored. The multi-user operating system determines whether the user entered a shared credential, e.g., by comparing the credential entered by the user against all shared credentials listed in the control file. Upon finding a match between the credential entered by the user and a shared credential listed in the control file, the multi-user operating system determines that the user entered the matched shared credential, and the control proceeds to step 220. Upon finding no match between the credential entered by the user and all the shared credentials listed in the control file, at step 215, the multi-user operating system proceeds a standard login process, e.g., granting an access to the multi-user operating system upon verifying the entered credential and a corresponding password subsequently entered by the user.

At step 220, the multi-user operating system prompts the user to enter a password corresponding to the matched shared credential. At step 225, after the user enters a password, the multi-user operating system determines whether the password entered by the user is a valid password corresponding to the matched shared credential. In one embodiment, there is provided a file, e.g., /etc/passwd file in UNIX® system, which lists credentials and their corresponding valid passwords. In order to determine whether the user entered a valid password, the multi-user operating system reads this provided file and compares the password entered by the user against a corresponding valid password listed in the read file.

If the entered password is determined as an invalid password, e.g., no match between the password entered by the user against a corresponding valid password listed in the read file, at step 230, the multi-user operating system proceeds a standard error processing, e.g., displaying an error message to the user and prompting the user to re-enter a password corresponding to the matched shared credential. If the entered password is determined as a valid password corresponding to the matched shared credential, e.g., a match between the password entered by the user against a corresponding valid password listed in the read file, at step 235, the multi-user operating system prompts the user to enter an individual credential of the user. At steps 240-245, the user enters his/her individual credential. The multi-user operating system determines whether the user is a valid user who can use the matched shared credential. In order to determine whether the user is a valid user who can use the matched shared credential, the multi-user operating system evaluates whether the entered individual credential is listed, e.g., in the control file, under the matched shared credential. If the entered individual credential of the user is not listed, in the control file, under the matched shared credential, at step 250, the multi-user operating system proceeds a standard error processing, e.g., displaying an error message that indicates that the user is not authorized to use the matched shared credential.

At step 255, the multi-user operating system prompts the user to enter a password corresponding to the entered individual credential. At step 260, the user enters the password corresponding to the entered individual credential. The multi-user operating system determines whether the entered password is a valid password corresponding to the entered individual credential. In one embodiment, there is provided a file, e.g., /etc/passwd file in UNIX® system that lists credentials and their corresponding valid passwords. In order to determine whether the user entered a valid password corresponding to the entered individual credential, the multi-user operating system reads this provided file and compares the password entered by the user against a corresponding valid password listed in the read file. If the entered password is determined as an invalid password, e.g., no match between the password entered by the user against a corresponding valid password listed in the read file, the multi-user operating system proceeds a standard error processing, e.g., displaying an error message to the user and prompting the user to re-enter a password corresponding to the entered individual credential. If the entered password is determined as a valid password corresponding to the entered individual credential, e.g., a match between the password entered by the user against a corresponding valid password listed in the read file, at step 270, the multi-user operating system grants the access to the user, and the user is logged into the multi-user operating system as the shared credential.

The multi-user operating system tracks commands entered by the user who is logged into the multi-user operating system via the matched shared credential while the user is using the multi-user operating system. The tracked commands include, but are not limited to: the entered individual credential and the commands entered by the user. In order to track the commands entered by the user, the multi-user operating system stores, in a file (e.g., history file in UNIX® system), the entered commands along with the entered individual credential.

The stored file includes the entered commands and corresponding individual credentials of users who entered those commands using the shared credential. The stored file can be viewed by a command, e.g., "history" command in UINX® system, entered by any user entitled to view the stored file.

Figure 2B:
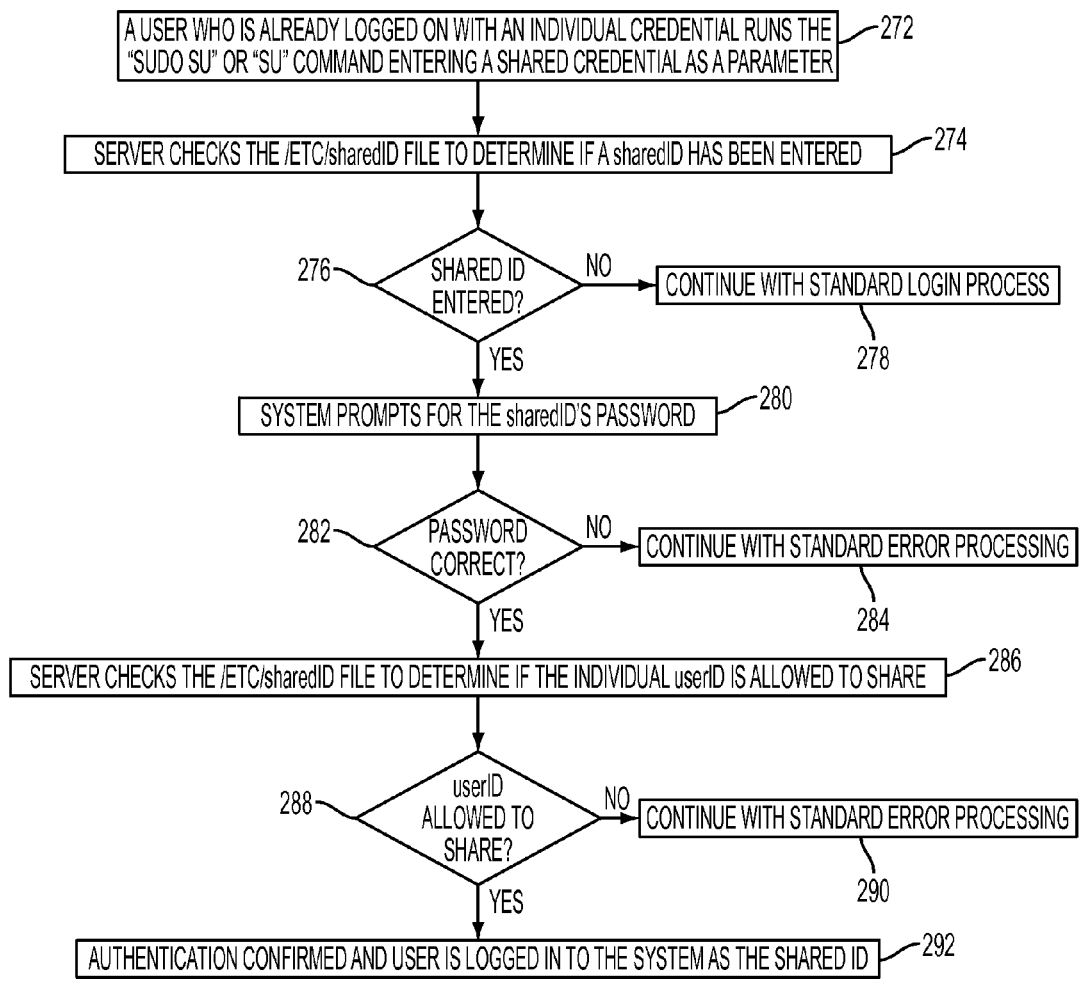
FIG. 2B illustrates a flow chart that describes method steps of another login process to a multi-user operating system.

FIG. 2B illustrates a flow chart that describes method steps of another login process to the multi-user operating system in another embodiment. At step 272, a user initially logs into the multi-user operating system using an individual credential of that user. Then, the user runs a "sudo su" or "su" command with a parameter, e.g., a credential of someone else. At step 274, when the user runs a "sudo su" or "su" command with a parameter, e.g., a credential of someone else, the multi-user operating system reads the control file. The multi-user operating system determines whether the user entered a shared credential as the parameter, e.g., by comparing the parameter entered by the user against all shared credentials listed in the control file. Upon finding a match between the parameter entered by the user and a shared credential listed in the control file, the multi-user operating system determines that the user entered a shared credential, and the control proceeds to step 280. Upon finding no match between the parameter entered by the user and all the shared credentials listed in the control file, at step 278, the multi-user operating system elevates the individual credential of the user to the credential of someone else.

At step 280, the multi-user operating system prompts the user to enter a password corresponding to the shared credential. At step 282, after the user enters a password, the multi-user operating system determines whether the password entered by the user is a valid password corresponding to the shared credential, e.g., based on /etc/passwd file in UNIX® system, which lists credentials and their corresponding valid encrypted passwords. If the entered password is determined as an invalid password, at step 284, the multi-user operating system proceeds to standard error processing, e.g., displaying an error message to the user and prompting the user to re-enter a password corresponding to the shared credential.

If the entered password is determined as a valid password corresponding to the shared credential, the control proceeds to step 286. At steps 286-288, the multi-user operating system determines whether the user is a valid user who can use the shared credential. In order to determine whether the user is a valid user who can use the shared credential, the multi-user operating system evaluates whether the entered individual credential is listed, e.g., in the control file, under the shared credential. If the individual credential of the user is not listed, in the control file, under the shared credential, at step 290, the multi-user operating system proceeds a standard error processing, e.g., displaying an error message that indicates that the user is not authorized to use the shared credential. If the individual credential of the user is listed, in the control file, under the shared credential, at step 292, the multi-user operating system permits the user to use the shared credential in a further processing in the multi-user operating system. After the user is permitted to use the shared credential in a further processing in the multi-user operating system, the multi-user operating system tracks commands entered by the user and other users using the shared credential along with corresponding individual credentials. In a further embodiment, the individual credential may also be used as the shared credential.

Figure 3:
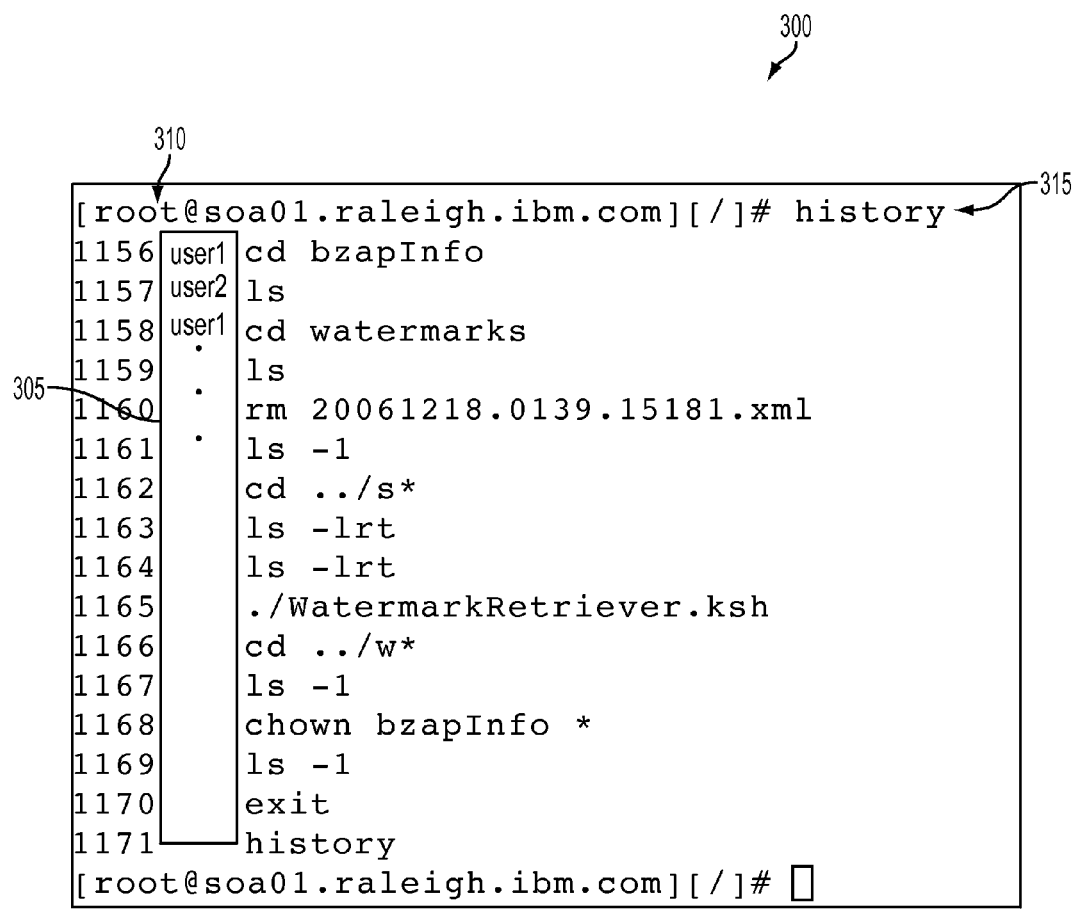
FIG. 3 illustrates an exemplary history file that shows individual credentials of users who entered corresponding commands.

FIG. 3 illustrates an exemplary stored file 300 that indicates commands entered by users who are represented by individual credentials 305 and who use a shared credential 310, e.g., "root" ID. As shown in FIG. 3, a user using this shared credential 310 can track commands entered by other users using this shared credential, e.g., by entering "history" command 315 in UNIX® system. As shown in FIG. 3, a user using this shared credential can identify who entered which command by using that same shared credential.

FIG. 4 illustrates a flow chart that describes method steps for generating the stored file, e.g., the exemplary stored file 300 shown in FIG. 3, which includes entered commands and corresponding individual credentials of users who entered those commands. At step 400, a user successfully logs into the multi-user operating system, e.g., by providing a valid shared credential, a valid password corresponding to the valid shared credential, a valid individual credential, and a valid password corresponding to the valid individual credential to the multi-user operating system. At step 405, the user enters a command, e.g., "cd" command in UNIX® system. "cd" command in UNIX® system causes the multi-user operating system to change a current working directory of that user.

At step 410, the multi-user operating system evaluates whether the user logged into the multi-user operating system with a shared credential, e.g., based on the information determined at step 210 in FIG. 2A or at step 276 in FIG. 2B, depending on which type of login was run. If the user logged into the multi-user operating system using the shared credential, the control proceeds to step 415. Otherwise, at step 420, the multi-user operating system writes commands entered by the user to a file, e.g., history file in UNIX® system.

At step 415, the multi-user operating system writes commands entered by the user to a file, e.g., history file in UNIX® system, along with an individual credential of the user. Thus, the file indicates the commands entered by the user and the individual credential of the user. Based on the file, the multi-user operating system allows a user using the same shared credential to track activities of other users using the same shared credential. At step 425, the multi-user operating system processes the entered commands. At step 430, the multi-user operating system allows the user to enter a new command. The control repeats steps 405-430 until the user logs out the multi-user operating system.

Following describes an exemplary usage scenario based on a traditional multi-user operating system that does not run method steps 200-270 and 400-430. A team of five multi-user operating system administrators works together to provide support for a hardware server computer on a 24 hours per day and 7 days a week schedule. While working late into a night in order to troubleshoot that hardware server computer, a multi-user operating system administrator accidentally deletes a properties file that drives a configuration for a web application that is hosted on that hardware server computer. It is known that only a user entitled to use "root" ID has an authority to delete that properties file. In order to identify who deleted that properties file, a senior multi-user operating system administrator runs "history" command to determine the most recent activity of users of "root" ID. After reviewing a history file retrieved by the "history" command, the senior administrator confirms that a user using "root" ID deleted the file, but there is no way to determine which user used "root" ID to perform the deletion. The senior administrator then checks the history files of each user known to have an access to "root" ID using "sudo" command ("sudo" command is explained above.) However, there were so many entries in each user's history file that reading all the entries would be time-consuming. Also, some users logged in directly with "root" ID, further complicating the process for identifying a specific user who deleted the properties file. Although the senior administrator attempted to identify that specific user, e.g., by reading some entries of each user's history files, the senior administrator finally gave up identifying that specific user because there was no explicit way to identify that specific user under the traditional multi-user operating system.

Following describes an exemplary usage scenario based on a novel multi-user operating system that runs method steps 200-270 and 400-430. A team of five multi-user operating system administrators works together to provide support for a hardware server computer on a 24 hours per day and 7 days a week schedule. While the hardware server computer is commissioned, each multi-user operating system administrator is given the authority to share "root" ID to perform administrative actions during his/her shift. The control file, e.g., /etc/shared.ids file is configured as follows:
root: userID1, userID2, userID3, userID4, userID5
While working late into a night in order to troubleshoot that hardware server computer, a multi-user operating system administrator accidentally deletes a properties file that drives a configuration for a web application that is hosted on that hardware server computer. It is known that only a user entitled to use "root" ID has an authority to delete that properties file. In order to identify who deleted that properties file, a senior multi-user operating system administrator runs "history" command to determine the most recent activity of users of "root" ID. Based on the control file, "root" ID was properly configured for sharing so the history file retrieved by the "history" command includes each user who logged in as "root" ID and commands run each user. After reviewing the history file, the senior administrator confirms that a specific user using "root" ID deleted the properties file and is able to see that that specific user used "userID2" individual credential when that specific user deleted the properties file.

FIG. 5 illustrates exemplary computing systems in which the multi-user operating system, which runs the method steps 200-270 and 400-430, can be implemented: a parallel computing system 500 including at least one processor 555 and at least one memory device 570, a mainframe computer 505 including at least one processor 556 and at least one memory device 571, a desktop computer 510 including at least one processor 557 and at least one memory device 572, a workstation 515 including at least one processor 558 and at least one memory device 573, a tablet computer 520 including at least one processor 556 and at least one memory device 574, a netbook computer 525 including at least one processor 560 and at least one memory device 575, a smartphone 530 including at least one processor 561 and at least one memory device 576, a laptop computer 535 including at least one processor 562 and at least one memory device 577, or a cloud computing system 540 including at least one storage device 545 and at least one server device 550.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for using a multi-user operating system, the method including:
    prompting a user to enter a shared credential and an individual credential when the user is attempting to access the multi-user operating system, wherein the shared credential is associated with the multi-operating system;
    reading, by the multi-user operating system, in response to the user attempting to access the multi-user operating system, a control file, the control file created to include a mapping of at least one shared credential to individual credentials of users who can use the at least one shared credential;
    determining whether the entered shared credential is listed in the control file; and
    in response to determining that the entered shared credential is listed in the control file, further determining whether the entered individual credential is mapped to the entered shared credential, and
    granting access to the user in response to the entered individual credential being mapped to the entered shared credential;
    repeating said prompting, said reading, said determining and said granting access for other users of the multi-user operating system; and
    automatically tracking commands entered by the user and the other users granted access to the multi-user operating system via same shared credential, the user and the other users using the same shared credential at the same time, the tracked commands relating to files and application in the multi-user operating system accessible after the user logs in to said multi-operating system, and said tracked commands indicating each individual credential of the user and the other users for each command entered, wherein a processor coupled to a memory device performs steps of: the prompting, the reading, the determining, the granting, the repeating and the automatic tracking.

2. The method according to claim 1, wherein the step of tracking includes a step of:
storing, in a file, the tracked commands along with the entered individual credential.

3. The method according to claim 2, wherein the stored file can be viewed by a command entered by any user entitled to view the stored file.

4. The method according to claim 3, whereby a user using the entered shared credential can track commands entered by the other users using the entered shared credential.

5. The method according to claim 4, wherein the stored file includes individual credentials of users who entered the tracked commands.

6. The method according to claim 1, wherein the control file is stored in a specific directory of the multi-user operating system.

7. The method according to claim 1, further comprising:
preventing a user using the entered shared credential and whose individual credential is not mapped to the entered shared credential from accessing the multi-user operating system.

8. The method according to claim 1, further comprising:
accessing, by the user, the multi-user operating system using the individual credential of the user;
attempting, by the user, to use the shared credential after accessing the multi-user operating system using the individual credential;
verifying whether user can use the shared credential; and
permitting the user to use the shared credential if the user can use the shared credential.

9. A method for using a multi-user operating system, the method comprising:
prompting a user to enter a shared identification (sharedID) credential when the user is attempting to access the multi-user operating system;
verifying the user's entered sharedID credential, said verifying comprising:
reading, by the multi-user operating system, in response to the user attempting to access the multi-user operating system, a control file,
the control file providing a listing of sharedID credentials and corresponding individual credentials;
comparing the entered sharedID credential against sharedID credentials listed in the control file for verification and when verified:
prompting the user to enter an individual user credential;
determining, by using the control file, whether the entered sharedID credential is mapped with the entered individual user credential;
using the multi-user operating system upon finding a mapping between the entered individual user credential and the entered sharedID credential listed in the control file;
repeating said prompting entry of sharedID credential, said verifying, said reading, said comparing, said prompting to enter an individual user credential, said determining, and said using for other users of the multi-user operating system;
automatically tracking commands entered by the individual user and the other users granted access to the multi-user operating system via same sharedID credential, the user and the other users using the same sharedID credential at the same time, the tracked commands relating to files and application in the multi-user operating system accessible after the user logs in to said multi-operating system, and said tracked commands indicating each individual user credential of the user and the other users, wherein a processor coupled to a memory device performs steps of: the prompting entry of sharedID credential, the verifying, the reading, the comparing, the prompting user to enter an individual credential, the determining, the using, the repeating and the automatic tracking.

10. A method for using a multi-user operating system, the method comprising:
prompting a first user to enter an individual credential when the first user is accessing the multi-user operating system;
verifying the first user's entered individual credential, said verifying comprising:
reading, by the multi-user operating system, in response to the user attempting to access the multi-user operating system, a control file, the control file providing a listing of shared credentials and corresponding individual credentials;
granting access to the first user in response to the entered individual credential being listed in said control file;
executing a command using a credential of another user after granting the access based on the entered individual credential;
determining, by reading the control file, whether
the credential of the another user matches a shared credential listed in the control file;
using the multi-user operating system upon finding a match between the another user's credential and a shared credential listed in the control file;
switching the first user's entered individual credential to the another user's credential upon finding a match between the another user's credential and a shared credential listed in the control file;
repeating said prompting, said verifying, said reading, said granting, said executing, said determining, said using, and said switching for other users of the multi-user operating system;
automatically tracking commands entered by the other users and the first user granted access to the multi-user operating system via same shared credential, the other users and the first user using the same shared credential at the same time, the tracked commands relating to files and applications running in the multi-user operating system accessible after the user logs in to said multi-operating system, and said tracked commands indicating each individual credential of the other users and the first user,
wherein a processor coupled to a memory device performs steps of: the prompting, the verifying, the reading, the granting, the executing, the determining, the using, the switching, the repeating and the automatic tracking.

* * * * *